J. Temple,
Sharpening Reciprocating Saws.
No. 81,035. Patented Aug. 11, 1868.

Witnesses:

Inventor:
Joseph Temple
per Alexander Mason

United States Patent Office.

JOSEPH TEMPLE, OF TERRE HAUTE, INDIANA.

Letters Patent No. 81,035, dated August 11, 1868.

IMPROVEMENT IN SAW-FILING MACHINE.

*The Schedule referred to in these Letters Patent and making part of the same.*

TO ALL WHOM IT MAY CONCERN:

Be it known that I, JOSEPH TEMPLE, of Terre Haute, in the county of Vigo, and in the State of Indiana, have invented certain new and useful Improvements in Machine for Filing Saws; and do hereby declare that the following is a full, clear, and exact description thereof, reference being had to the accompanying drawings, and to the letters of reference marked thereon. In the annexed drawings forming part of this specification—

Figure 1:
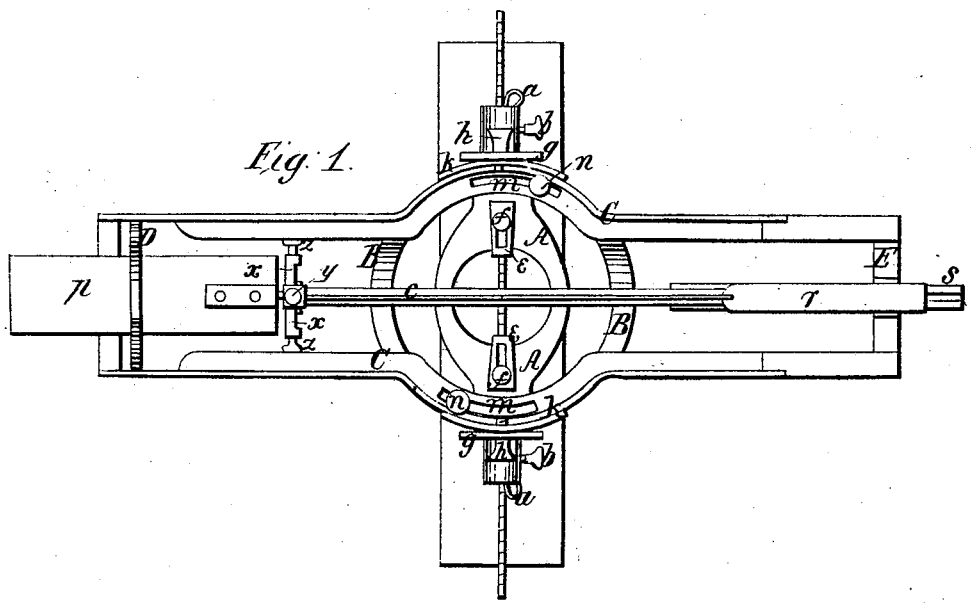
Figure 2:
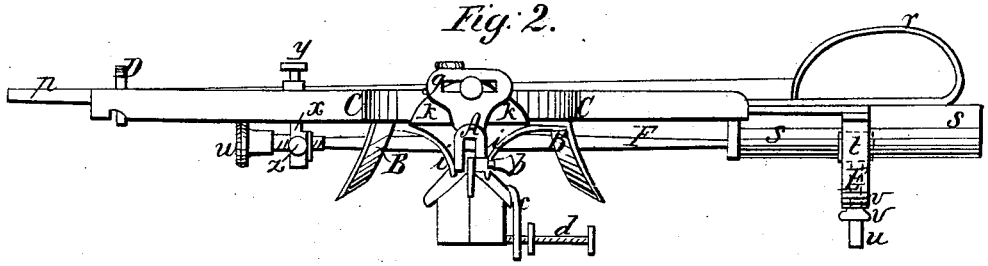

Figure 1 is a plan view, and
Figure 2 is a side view.

The nature of my invention consists in the manner of arranging and combining several movable and adjustable plates and frames, so that a device is formed, by which saws may be filed with perfect ease, with exactness and accuracy, and so that any shape or form of teeth desired may be obtained.

To enable others skilled in the art to make and use my invention, I will proceed to describe its construction and operation.

In the annexed drawings, forming part of this specification, A represents a bed-plate, of any suitable kind of metal, so constructed that its ends are bent and form grooves on its under side, which fit over the teeth of the saw, and rest on the points of them. The sides of the bed-plate are bent down, leaving a circular space in the centre for the saw-teeth to project, and for the file to work in. The bed-plate A is adjustable, so as to fit any thickness of saw-plate, by means of the springs $a\ a$, which are fastened on the outside of the bed-plate, run in the grooves underneath, and are tightened or loosened by the screws C C. The upper side of the bed-plate is provided with two gauges $e\ e$, which extend into the centre hole, and adjustable by means of the screws $f\ f$, so that they can fit any-sized saw-teeth, thereby serving to equalize the distance of the teeth from each other. From the side of the bed-plate a strap, $c$, runs down, with a screw, $d$, in its lower end, which is to rest on or against the clamp, which holds the saw, and thereby helps to keep the machine steady while at work.

The grooved ends of the bed-plate A are also provided with slotted ears $g\ g$, on their upper side, for the purpose of adjusting the saddle-piece B.

This saddle-piece is made in the shape of an oblong ring, with its ends turned down below the turned-down sides of the bed-plate, so as to leave the space in the centre, where the saw-teeth project, free. It rests on the grooved ends of the bed-plate, and has flanges $i\ i$ extending down on each side of them, so that it may be turned either up or down, thereby allowing the file to work at any angle, and it is adjustable at any angle desired, by means of the screws $h\ h$, which run through the slotted ears $g\ g$, into the ears $k\ k$, on top of the saddle-piece.

On top of the saddle-piece B rests the main frame C, which is made in circular form in the centre, with slots $m\ m$ in its bottom, so that it can be turned either right or left, and be adjusted by means of the screws $n\ n$, through these slots into the top of the saddle-piece, thereby allowing the file to be worked at any angle, either right or left, as may be desired.

The file-holder consists of a metal bar, $o$, with a wooden block, $p$, attached to one end, and its other end forms the handle $r$, attached to the lower side of which is another block of wood, $s$. The wooden block $p$ runs through a slot in the cross-piece D in one end of the main frame, and the block $s$, with handle $r$ attached, rests in a socket, $t$, on the screw $u$, which screw runs through the stirrup E, on the other end of the main frame, and is regulated by the nuts $v\ v$, one above and one below the stirrup, thereby governing the depth of the work done by the file.

The file F is inserted in the wooden block $s$, under the metal bar $o$, and is fastened at its other end by a screw, $w$, which runs through a movable nut in a small metal frame, $x$, adjusted to the lower side of the bar $o$, and on any part thereof, by means of a thumb-screw, $y$. The nut in the frame $x$ can be moved either to the right or left, by means of the two small screws $z\ z$, which run through the sides of the frame.

Having thus fully described my invention, what I claim as new, and desire to secure by Letters Patent, is—

The arrangement of the bed-plate A, saddle-piece B, and frame C, in combination with the file-holder in which the file is placed, when all the parts are constructed and operated in the manner and by the means described, so as to be adjustable for the purpose of giving any depth or pitch to the teeth of a saw that may be desired, substantially as herein set forth.

In testimony that I claim the foregoing, I have hereunto set my hand, this 4th day of May, 1868.

JOSEPH TEMPLE.

Witnesses:
SIDNEY TEMPLE,
CHARLES TEMPLE.